United States Patent
Zhu et al.

(10) Patent No.: US 12,467,032 B2
(45) Date of Patent: Nov. 11, 2025

(54) ENDOPHYTIC FUNGUS OF OPHIOPOGON JAPONICUS AND USE THEREOF

(71) Applicant: ZHEJIANG CHINESE MEDICAL UNIVERSITY, Zhejiang (CN)

(72) Inventors: Bo Zhu, Hangzhou (CN); Luping Qin, Hangzhou (CN); Lingyan Wu, Hangzhou (CN); Yichun Zhu, Hangzhou (CN); Qiongxiao Wang, Hangzhou (CN); Xiaoyu Jiang, Hangzhou (CN)

(73) Assignee: ZHEJIANG CHINESE MEDICAL UNIVERSITY, Hangzhou (CN)

( * ) Notice: Subject to any disclaimer, the term of this patent is extended or adjusted under 35 U.S.C. 154(b) by 0 days.

(21) Appl. No.: 19/096,765

(22) Filed: Apr. 1, 2025

(65) Prior Publication Data

US 2025/0250534 A1    Aug. 7, 2025

Related U.S. Application Data

(63) Continuation of application No. PCT/CN2023/125393, filed on Oct. 19, 2023.

(30) Foreign Application Priority Data

Aug. 24, 2023    (CN) .......................... 202311072066.7

(51) Int. Cl.
  *C12N 1/14*    (2006.01)
  *C12P 17/06*    (2006.01)
  *C12R 1/77*    (2006.01)

(52) U.S. Cl.
  CPC .............. *C12N 1/145* (2021.05); *C12P 17/06* (2013.01); *C12R 2001/77* (2021.05)

(58) Field of Classification Search
  CPC .......................... C12N 1/145; C12R 2001/77
  See application file for complete search history.

(56) References Cited

FOREIGN PATENT DOCUMENTS

| | | | |
|---|---|---|---|
| CN | 105039204 | A | 11/2015 |
| CN | 105367531 | A | 3/2016 |
| CN | 107723245 | A | 2/2018 |
| CN | 110885763 | A | 3/2020 |
| CN | 110903986 | A | 3/2020 |
| CN | 113151013 | A | 7/2021 |
| CN | 114921347 | A | 8/2022 |
| CN | 115960092 | A | 4/2023 |
| WO | 03082309 | A1 | 10/2003 |

OTHER PUBLICATIONS

International Search Report (PCT/CN2023/125393); Date of Mailing: Dec. 13, 2023(10 pages).
Chinese First Office Action(202311072066.7); Date of Mailing: May 22, 2024(11 pages).
Chinese Notice Of Allowance(202311072066.7); Date of Mailing: Aug. 6, 2024(5 pages).
GenBank: MZ687048.1, (2021).
GenBank: MT251175.1, (2020).
Chen, Y. T., et al. "Isolation and identification of endofungi from Liriope spicata." J Laiyang Agri Col (Nat Sci) 23 (2006) : 13-16.
Liu, Lei. "Isolation and identification of fungal endophytes from Ophiopogon japonicustheir antimicrobial activities." Zhongcaoyao (2016) : 1382-1391.

*Primary Examiner* — Robert J Yamasaki
(74) *Attorney, Agent, or Firm* — Wiersch Law Group

(57) ABSTRACT

An endophytic fungus of *Ophiopogon japonicus* and use thereof provided. The endophytic fungus is isolated from the living *Ophiopogon japonicus* plants, an *Ophiopogon* plant of Liliaceae, by a traditional tissue block separation method, with a category name of *Fusarium falciforme* OJ106, and a deposit number of CGMCC No. 40703. The methylophiopogonanone B is prepared through the PDB liquid fermentation of endophytic fungus strains. The endophytic fungus of *Ophiopogon japonicus* is an important microorganism for searching for new resources of the methylophiopogonanone B, and has a high application value.

SEQ ID NO. 1
cgactttggtgtgcgggagggacattaccgagttatacaactcatc
aaccctgtgaacatacctataacgttgcctcggcgggaacagacg
gccccgtaacacgggccgcccccgccagaagaccccctaactctg
tttctataatgtttcttctgagtaaacaagcaaataaattaaaac
tttcaacaacggatctcttggctctggcatcgatgaaaaacgcag
cgaaatgcgataagtaatgtgaattgcaaaattcagtgaatcatc
gaatctttgaacgcacattgccccgacagtattctggcgggcatg
cctgttcaagcgtcattacaaccctcaggccccgggcctggcgt
tggggatcggeggaagcccctgcgggcacaacgccgtcccccaa
atacagtggcggtcccgccgcagcttccattgcgtagtagctaac
acctcgcaactggagagcggcgcggccacgccgtaaaacacccaa
cttctgaatgttgacctcgaatcaggtaggaatacccgctgaact
taagcatatcaataagcggtagtta

4 Claims, 6 Drawing Sheets
Specification includes a Sequence Listing.

Front view      Back view

SEQUENCE LISTING

```
Sequence total quantity: 1
SEQ ID NO: 1              moltype = DNA   length = 566
FEATURE                   Location/Qualifiers
source                    1..566
                          mol_type = genomic DNA
                          organism = Fusarium falciforme
SEQUENCE: 1
cgactttggt gtgcgggagg gacattaccg agttatacaa ctcatcaacc ctgtgaacat   60
acctataacg ttgcctcggc gggaacagac ggccccgtaa cacgggccgc ccccgccaga  120
agaccccta  actctgtttc tataatgttt cttctgagta aacaagcaaa taaattaaaa  180
ctttcaacaa cggatctctt ggctctggca tcgatgaaaa acgcagcgaa atgcgataag  240
taatgtgaat tgcaaaattc agtgaatcat cgaatctttg aacgcacatt gccccgacag  300
tattctggcg ggcatgcctg ttcaagcgtc attacaaccc tcaggccccc gggcctggcg  360
ttggggatcg gcggaagccc cctgcgggca caacgccgtc ccccaaatac agtggcggtc  420
ccgccgcagc ttccattgcg tagtagctaa cacctcgcaa ctggagagcg gcgcggccac  480
gccgtaaaac acccaacttc tgaatgttga cctcgaatca ggtaggaata cccgctgaac  540
ttaagcatat caataagcgg tagtta                                       566
```

ENDOPHYTIC FUNGUS OF OPHIOPOGON JAPONICUS AND USE THEREOF

CROSS-REFERENCE TO RELATED APPLICATIONS

The present application is a National Stage of International Application No. PCT/CN2023/125393 filed on Oct. 19, 2023, which claims a priority to Chinese Patent Application No. 2023110720667, filed on Aug. 24, 2023, both of which are hereby incorporated by reference in their entireties.

REFERENCE TO SEQUENCE LISTING

The present application is being filed along with a Sequence Listing in an electronic format. The Sequence Listing is provided as a file entitled with "DF244129US-Sequence Listing ST.26", and created on Jan. 2, 2025, which is approximately 2.43 KB in size. The information in the electronic format of the Sequence Listing is incorporated herein by reference in its entirety.

TECHNICAL FIELD

The present disclosure relates to the technical field of microorganisms, particularly to an endophytic fungus *Ophiopogon japonicus* and a use thereof in preparing methylophiopogonanone B.

BACKGROUND

*Ophiopogon japonicus* has the effects of nourishing Yin, promoting fluid production, moistening lungs and clearing heart-fire, and can be used for treating lung dryness, dry cough, cough due to yin deficiency, throat obstruction, sore throat, body fluid injury, thirst, vexation, insomnia, intestinal dryness and constipation. *Ophiopogon japonicus* is a traditional Chinese medicine, which was first published in Sheng Nong's Herbal Classic. It has a good reputation for reducing weight, keeping young without feeling hungry with long-time administration. *Ophiopogon japonicus* is widely distributed in 16 provinces in China, among which Zhejiang, Sichuan, and Guangxi provinces have large cultivation areas and are the main producing areas of *Ophiopogon japonicus*. *Ophiopogon japonicus*, produced in Santai County, Mianyang, Sichuan Province, is called Chuan *Ophiopogon japonicus*, which is an authentic medicine of Sichuan medicine. *Ophiopogon japonicus* grown in Hangzhou, Yuyao and Cixi, Zhejiang Province, is known as Zhe *Ophiopogon japonicus*, which is one of the traditional "Zhejiang Eight Flavors" authentic medicinal materials.

Methylophiopogonanone B is the main effective component of *Ophiopogon japonicus*, which is a high isoflavone compound contained in *Ophiopogon japonicus* of Liliaceae. Studies have shown that methylophiopogonanone B has significant activities of scavenging DPPH free radicals and antioxidation, and is widely used in chemical industry, clinics and other fields. Some scholars used the binary mixed solvent composed of ionic liquid and water as extractant and ethyl acetate as detergent to perform fractional extraction and multi-stage countercurrent extraction from the ethyl acetate extract of *Ophiopogon japonicus*, thereby obtaining the raffinate rich in methylophiopogonanone B. After vacuum concentration, water washing and drying, methylophiopogonanone B is obtained. However, this method of extracting methylophiopogonanone B from the original medicinal materials is complicated, the yield of the compound is low, and the resource consumption of the original medicinal materials is large, which cannot meet the continuable industrial needs.

Endophytic fungi are the microorganisms that exist in the internal tissues of healthy plants, and they do not cause plant diseases. They are closely related to plant development and are important components of plant micro-ecosystems. In the long-term evolution process, endophytic fungi and their hosts co-evolved, and they formed a mutually beneficial symbiotic relationship. In recent years, the same or similar active components as the host plants have been extracted from dozens of endophytic fungi isolated from medicinal plants. Endophytic fungi, as a huge natural product resource pool, can be industrially produced without being limited by soil, climate and plant resource conditions, thus alleviating the shortage of drug sources. For example, some scholars obtained patulin, 5-methoxypatulin, variecoxanthone A and chryxanthone A by separation and purification from the ethyl acetate extract of the PDB culture medium fermentation product of *Aspergillus terreus* TZS-201607, an endophytic fungus of *Pseudostellaria heterophylla*, using silica gel column chromatography, Sephadex LH-20 gel column chromatography, reversed-phase column chromatography, and semi-preparative high performance liquid chromatography. Some scholars isolated heptadecanoic acid from the culture solution and hyphae of *Colletotrichum* sp. B-152, an endophytic fungus of *Dracaena cochinchinensis*, via chromatography and spectrum analysis. In addition, some scholars isolated and purified the secondary metabolites of *Penicillium solitum*, an endophytic fungus of Pyrola, obtained p-hydroxybenzoic acid and protocatechuic acid by column chromatography and preparative high performance liquid chromatography, and identified their structures by NMR and high-resolution mass spectrometry. Therefore, microbial fermentation is an important approach to obtain active compounds with pharmaceutical properties.

However, there is no report on an endophytic fungus that can produce methylophiopogonanone B by microbial fermentation and use thereof.

SUMMARY

An object of the present disclosure is to provide an endophytic fungus of *Ophiopogon japonicus* and use thereof, which can produce methylophiopogonanone B by way of microbial fermentation.

This object of the present disclosure is achieved through the following technical solution:

Provided is an endophytic fungus of *Ophiopogon japonicus*. The endophytic fungus is isolated from the living *Ophiopogon japonicus* plants, an *Ophiopogon* plant of Liliaceae, by a traditional tissue block separation method, with a category name of *Fusarium falciforme* OJ106, and a deposit number of CGMCC No. 40703. It has been deposited in the China General Microbiological Culture Collection Center on Jun. 16, 2023, the address of which is No. 3, First Yard, Beichen West Road, Chaoyang District, Beijing, 100101.

Use of an endophytic fungus of *Ophiopogon japonicus* is specifically a use of the endophytic fungus of *Ophiopogon japonicus* in preparation of methylophiopogonanone B.

Further, the endophytic fungus of *Ophiopogon japonicus* is adopted to prepare the methylophiopogonanone B by PDB liquid fermentation, which specifically includes the following steps:

(1) taking a certain number of hyphae with an inoculating needle from an endophytic fungus strain of *Ophiopogon japonicus* under aseptic conditions, inoculating the hyphae on a sterilized PDA plate, and cultivating the hyphae in a mould incubator at 26° C. until the hyphae cover the surface of a PDA culture medium; and (2) taking the PDA plate full of hyphae, preparing a fungus block with a puncher, placing the obtained fungus block in a PDB liquid culture medium for dark culture at 26° C., and extracting a hypha fermentation broth after the culture to obtain the methylophiopogonanone B.

Further, a formula of the PDB liquid fermentation medium is: 200 g of potato, 20 g of glucose and 1000 mL of pure water.

Further, a formula of the PDA culture medium is: 200 g of potato, 20 g of glucose, 15 g of agar and 1000 mL of pure water.

Further, in the step (2), the step of extracting a hypha fermentation broth after the culture to obtain the methylophiopogonanone B specifically includes:

filtering the hypha fermentation broth under a reduced pressure to be divided into two fractions of hyphae and fermentation broth, drying and crushing the hyphae, ultrasonicating with methanol in water bath, and filtering under a reduced pressure to obtain a hypha filtrate; and extracting the fermentation broth with an equal amount of ethyl acetate, combining extracted ethyl acetate liquid with the hypha filtrate, carrying out vacuum concentration to obtain a fermentation extract, and obtaining the methylophiopogonanone B by redissolution with methanol.

The present disclosure has the following advantages:

According to the present disclosure, endophytic fungus is isolated from living *Ophiopogon japonicus* plants, and methylophiopogonanone B can be obtained, by strain liquid fermentation, from the endophytic fungi, which is an important microorganism for exploring new resources of methylophiopogonanone B and has a high application value.

DESCRIPTION OF EMBODIMENTS

The specific embodiments provided by the present disclosure will be described in detail with examples followed.

Figure 1:
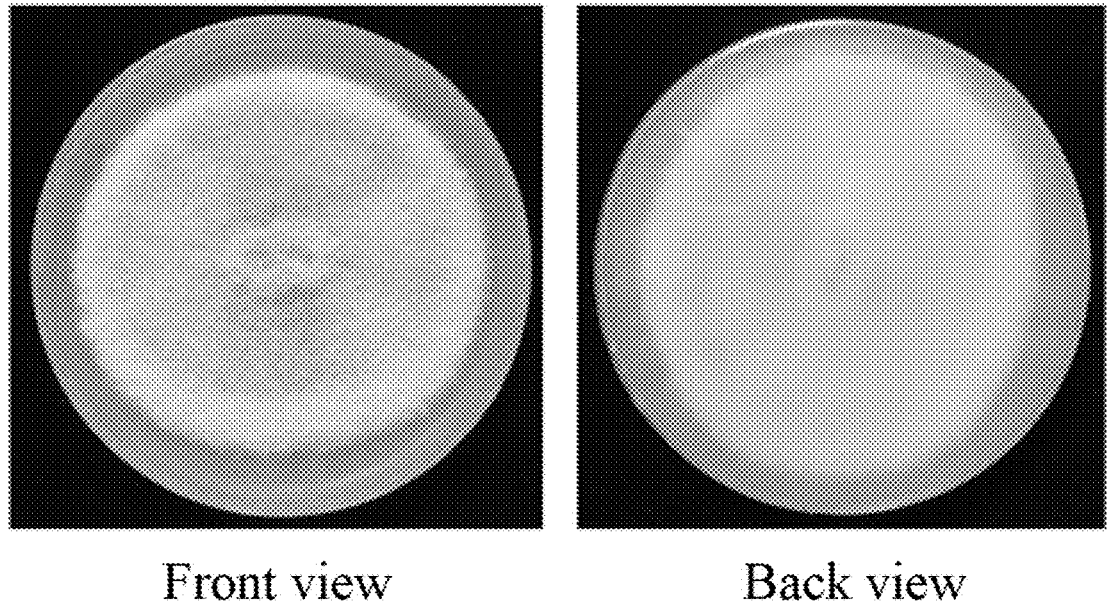
FIG. 1 shows the colony morphology of *Fusarium falciforme* OJ106 on a PDA solid medium.
Figure 2:
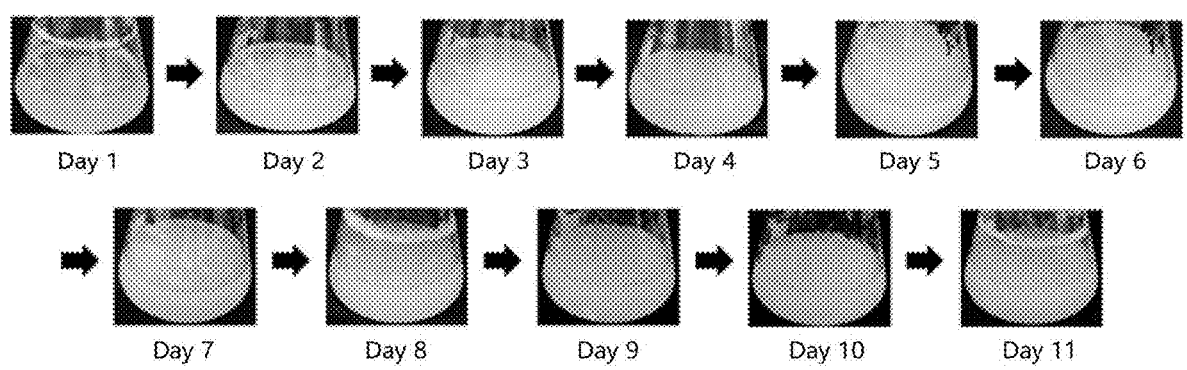
FIG. 2 shows a fermentation broth morphology of *Fusarium falciforme* OJ106 on a PDB liquid medium.

Example 1: Endophytic Fungi Isolated from Wild *Ophiopogon Japonicus* in Hangzhou, Zhejiang, China The endophytic fungi were isolated and obtained according to the following steps: fresh leaves, tuberous roots and roots of *Ophiopogon japonicus* were washed under tap water, the surface moisture was absorbed by sterilized filter paper, and three-step surface disinfection treatment was carried out: disinfection with 75 vol % of an ethanol solution for 1 min, disinfection with 1 wt % of a sodium hypochlorite solution (leaves for 1 min, roots for 3 min, tuberous roots for 5 min), and disinfection with 75 vol % of an ethanol solution for 30 s. After disinfection, they were rinsed with sterilized water for 5 times, and the surface moisture of plant tissues was absorbed by sterilized filter paper. A sterilized medical scalpel was used to cut leaves, roots and tuberous roots into tissue blocks with a size of about 5 mm×5 mm, and 12 tissue blocks were randomly selected from the three parts. Four tissue blocks, as one group, were placed in a culture dish with a PDA (200 g of potato, 20 g of glucose, 15 g of agar, 1000 mL of pure water) medium containing penicillin sodium 50 mg·L$^{-1}$. After the culture dish was sealed with a sealing film, the tissue blocks were cultured in a mould incubator at 26° C. for 7 days to observe the growth of colonies. After the colonies grew around the tissue block, they were transferred to a new PDA culture dish for continuous culture. The isolated and purified endophytic fungi were cultured on an inclined plane and stored at 4° C., and the isolated endophytic fungus strains were combined into different morphological types according to the colony characteristics. Finally, the endophytic fungus *Fusarium falciforme* OJ106 of the present disclosure was obtained, the solid culture characteristics thereof were: dark clone on a PDA culture medium at 26° C., rapid growth, round, white, fluffy hyphae with a thick outer ring and a thin inner ring, uniform colony morphology, neat edges, and staggered white hyphae, as shown in FIG. 1. The liquid culture thereof is characterized by the following:

(1) culturing in a PDB liquid medium at 26° C. and 180 rpm in the dark in a thermostatic shaker for 11 days;

(2) characteristics of fermentation culture: on the first day of culture, a small amount of white mycelium grew out of the white fungus block, and the fermentation broth was clear, so that the fungus block could be clearly observed; after 2-4 days of culture, white hyphae gradually grew from the white fungus block, and the fermentation broth became slightly turbid and the fungus block was blurred; after 5-8 days of culture, the fermentation broth gradually became turbid, and the fungus block was faintly visible, and the fermentation broth was in a thin gel form under shaking; from the 9$^{th}$ to 11$^{th}$ day of culture, the color of the fermentation broth deepened further, and the fungus block dissolved in the fermentation broth; and at the later stage, the fermentation broth was gelatinous and yellow-white, as shown in FIG. 2.

Figure 3:
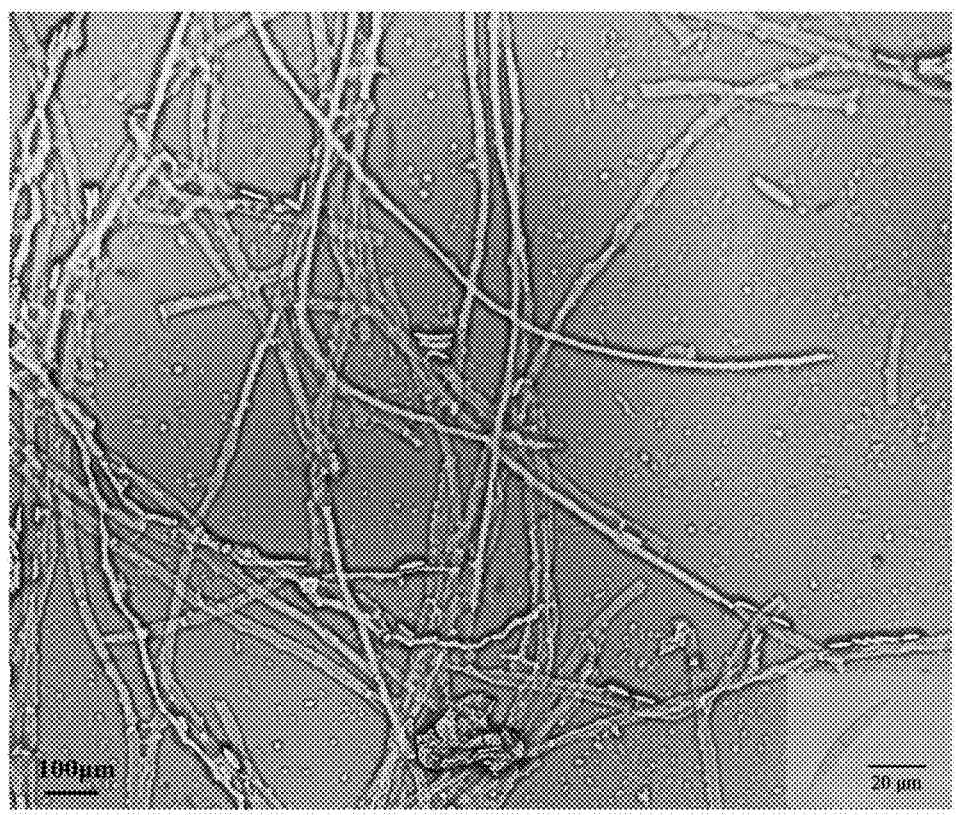
FIG. 3 shows the morphology of hyphae and spores of *Fusarium falciforme* OJ106 view by an optical microscope.

The morphological characteristics under the microscope were: the mycelium was translucent, with a thickness of 0.5-1.1 µm, and had branches and a smooth surface; and most spores were visible and had diaphragms inside, and were sickle-shaped, as shown in FIG. 3.

The endophytic fungus OJ106 (*Fusarium falciforme*) was deposited at a low temperature (4° C.).

Figure 4:
FIG. 4 shows the gel electrophoresis of *Fusarium falciforme* OJ106 ITS sequences amplified based on ITS5 and ITS4 primers.

A few hyphae were taken by an inoculating needle from a frozen tube of the OJ106 (*Fusarium falciforme*) strain under aseptic conditions, and activated in a new PDA culture medium, and then cultured in a mould incubator at 26° C. for 7 days until the plate was full of fungus for ITS sequence amplification and identification. The DNA of the strain was extracted, and ITS gene was amplified by PCR using ITS5 and ITS4 primers. PCR reaction cycle parameter amplification steps: 1, 95° C., 3 min, initial denaturation; 2, 94° C., 40 s, denaturation; 3, 52° C., 50 s, annealing; 4, 72° C., 1 min, extension; 5, repeat 2-4 for 35 times; 6, 72° C., 10 min, expansion. The electrophoretogram of ITS amplification is shown in FIG. 4, and the base sequence is shown in SEQ ID NO. 1.

Figure 5:
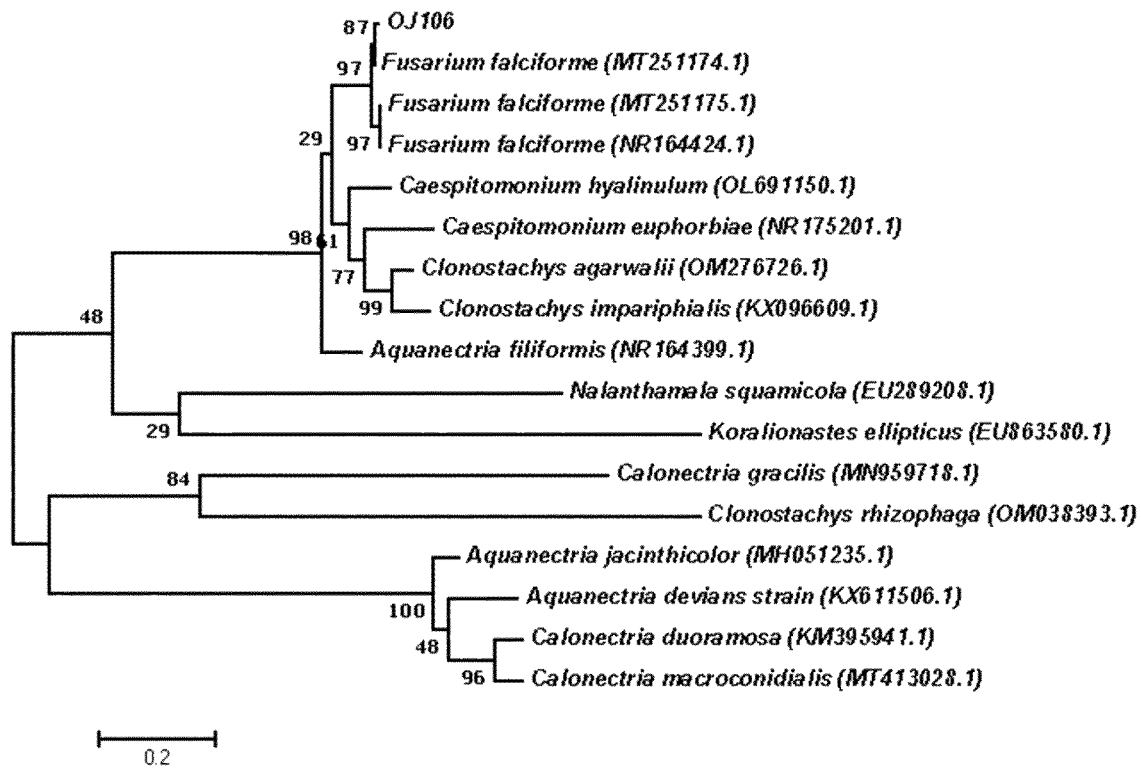
FIG. 5 shows the phylogenetic tree of *Fusarium falciforme* OJ106 based on ITS sequences (NJ method)

The PCR product detected by agarose gel electrophoresis was sent to Shanghai Bio Techne Company for sequencing. Using the sequence measured for the PCR product as a target sequence, the homologous sequence was searched in GenBank database in NCBI. The reference sequences which were most like the morphological sequence were downloaded, and Neighbor-joining (NJ) phylogenetic analysis was to randomly select one sequence, and comparison was carried out 1000 times to determine the phylogenetic status of the strain to be identified. The phylogenetic tree is shown in FIG. 5. The endophytic fungus strain of the present disclosure was identified as *Fusarium falciforme* by microbial taxonomy. The strain has been deposited in the China General Microbiological Culture Collection Center (CGMCC) (No. 3, First Yard, Beichen West Road, Chaoyang District, Beijing, 100101) on Jun. 16, 2023, with a deposit number of CGMCC No. 40703.

Example 2: Adopting the Endophytic Fungus of *Ophiopogon japonicus* to Prepare the Methylophiopogonanone B by PDB Liquid Fermentation (1) Strain activation and fermentation: the OJ106 *Ophiopogon japonicus* strain deposited at a low temperature (4° C.) was inoculated on a PDA culture medium, which was then placed in a mould incubator at 26° C. for 7 days in the dark. After the culture medium was covered with fungal hyphae, a puncher was burnt with an alcohol lamp for sterilization. After the puncher was cooled, 100 pieces of fungus blocks were punched out in an area with dense colonies in the PDA culture dish and transferred to a PDB conical flask with an inoculating needle that had been burnt and cooled in a similar way. The flask was sealed and put into a constant temperature shake flask for fermentation (constant temperature shake flask: 180 rpm, 26° C.). All the above operations were carried out under aseptic conditions, and the puncher and inoculating needle needed to be burned before and after each use. When the culture dish is punched, it was advisable to punch continuously in a fan shape. After 11 days of culture, the hypha fermentation broth was filtered under a reduced pressure and divided into hyphae and fermentation broth for subsequent use.

(2) Extraction of hyphae: the hyphae were dried in a 40° C. oven until the weight was constant. After weighing and grinding, the powder was poured into a hydrolysis tube, and corresponding methanol was added according to a volume ratio of 3:50, followed by ultrasound extraction (with a power of 250 W, and a frequency of 33 kHz) for 40 min. After filtering, the filtrate was concentrated to obtain an extract A.

(3) Extraction of filtrate: into the fermentation broth in step (1), an equal amount of ethyl acetate was added for extraction, and an ethyl acetate layer was taken to obtain extract B. The extracts A and B were combined by redissolution with methanol and then concentrated under a reduced pressure at 50° C. to obtain a fermentation extract.

Figure 6:
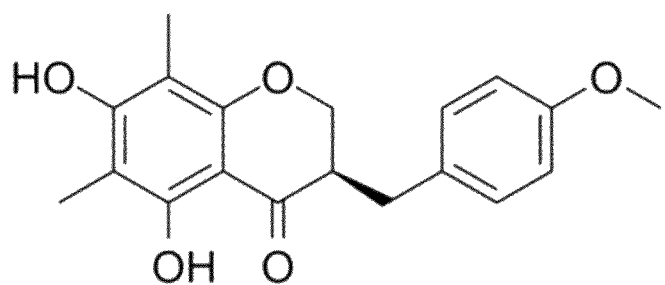
FIG. 6: chemical structure of methylophiopogonanone B.

(4) HPLC detection: An appropriate amount of a standard substance of methylophiopogonanone B was accurately weighed, respectively. Methylophiopogonanone B, the molecular formula of which is $C_{19}H_{20}O_5$, and the chemical structure of methylophiopogonanone B is shown in FIG. 6. Methanol was used to prepare standard solutions with final concentrations of 0.410, 0.296, 0.306 and 0.302 mg·mL$^{-1}$, respectively. A proper amount of the solution was poured into a liquid bottle, which was marked with the purity and date, and refrigerated at 4° C. for subsequent use. The fermentation broth of OJ106 was subjected to by HPLC analysis and compared with the standard substances of the main effective active ingredients of *Ophiopogon japonicus*. HPLC chromatographic conditions: ZORBAX Eclipse XDB-$C_{18}$ column (150 mm×4.6 mm, 5 µm), mobile phase water-acetonitrile, column temperature 30° C., 20 µL, detection wavelengths of 260 and 267 nm, a flow rate of 1 mL·min$^{-1}$, gradient elution procedure, sample solution injection in turn, and peak time recorded.

Figure 7:
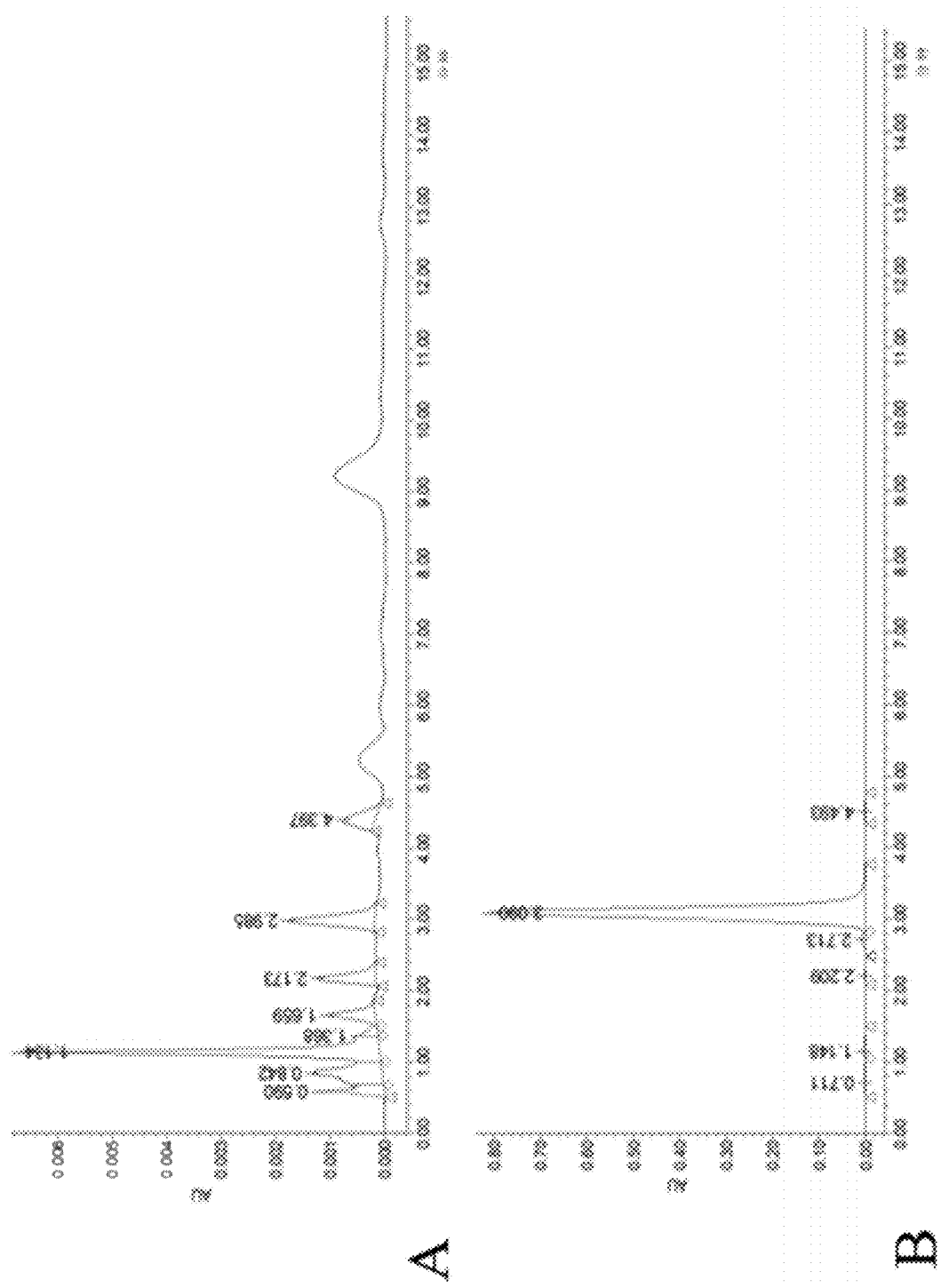
FIG. 7 shows the HPLC analysis of the fermentation broth of *Fusarium falciforme* OJ106 (A, B: a sample of methylophiopogonanone B and a standard product, respectively)
Figure 8:
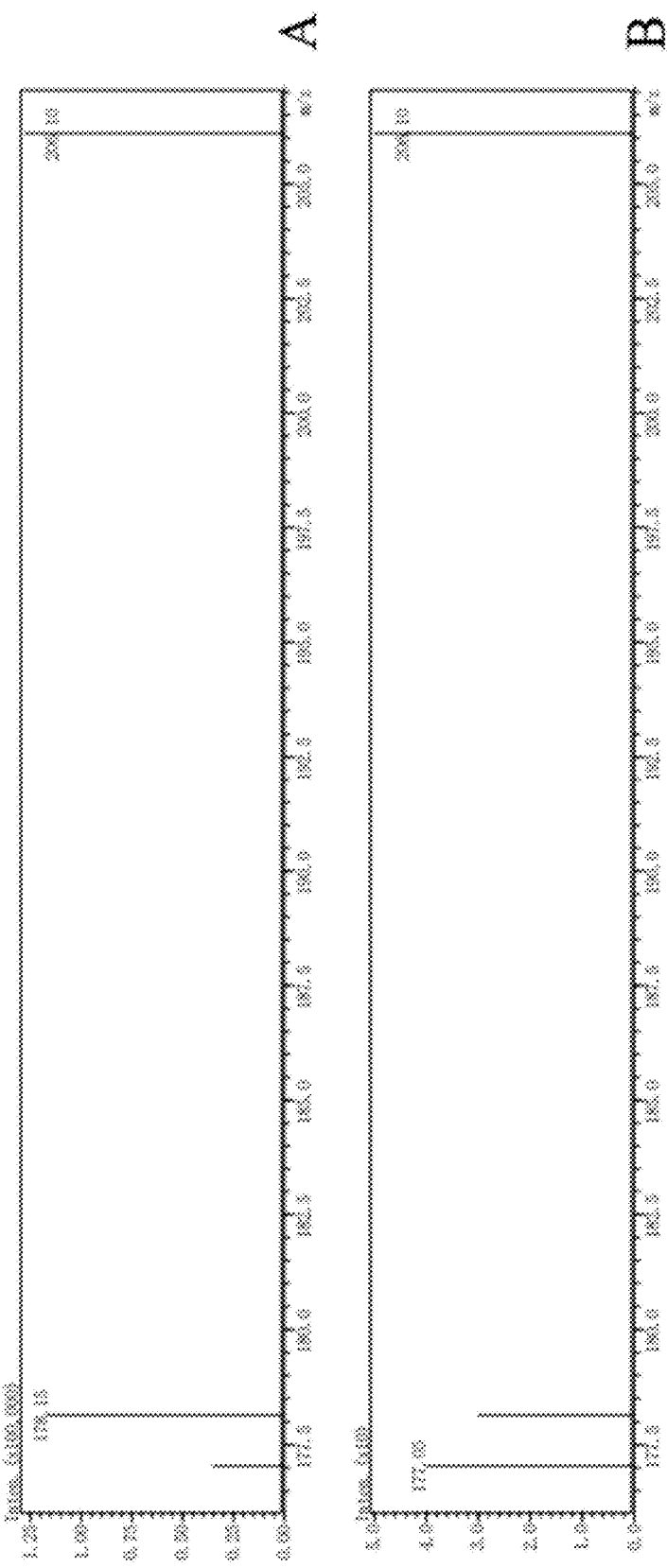
FIG. 8 shows the LC-MS$^n$ secondary mass spectrum of the fermentation broth of *Fusarium falciforme* OJ106 (A, B: a sample of methylophiopogonanone B and a standard product, respectively).
Figure 9:
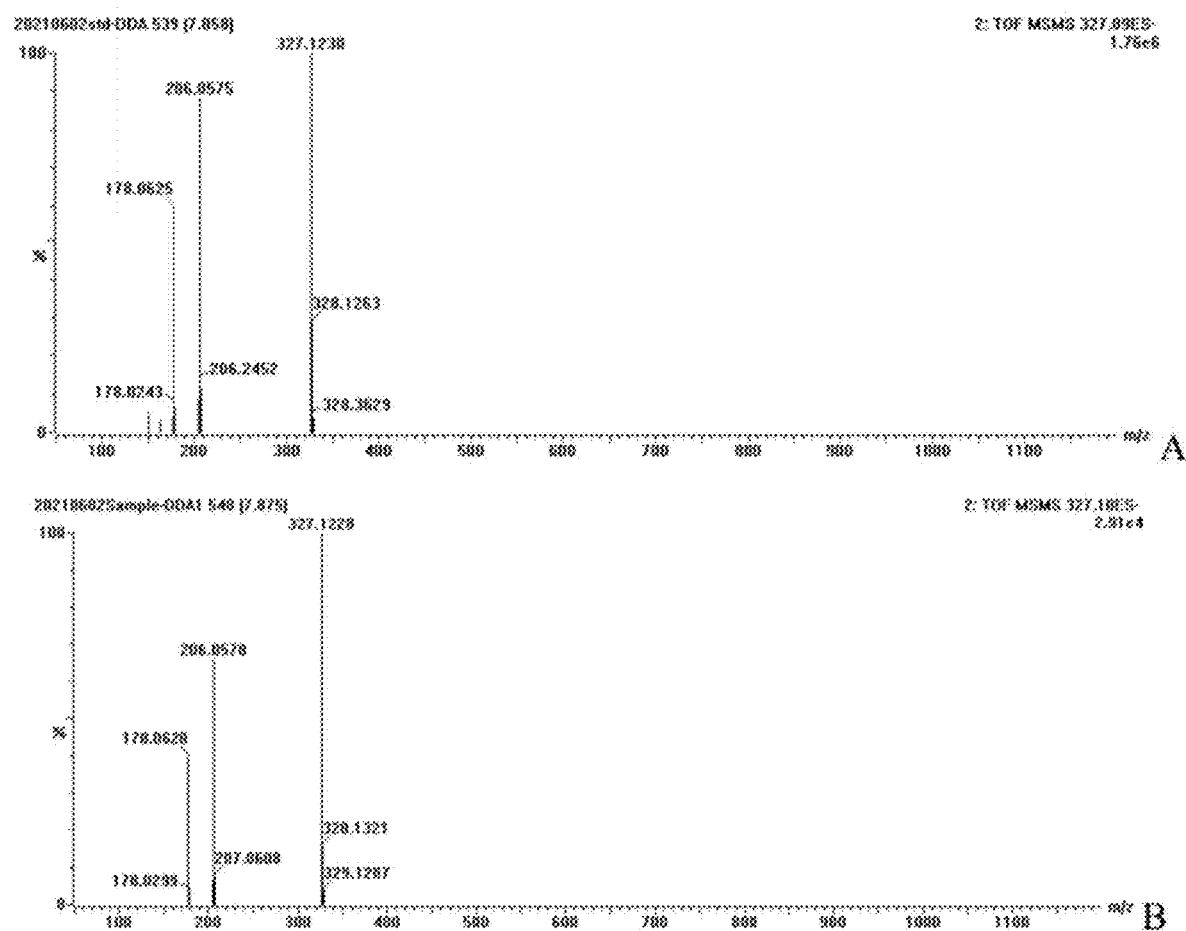
FIG. 9 shows the UHPLC-QTOF-MS secondary mass spectrum of the fermentation broth of *Fusarium falciforme* OJ106 (A, B: a sample of methylophiopogonanone B and a standard product, respectively).

(5) LC-MS$^n$/UHPLC-QTOF-MS detection: the OJ106 fermentation broth was further analyzed by LC-MS$^n$. ESI-MS conditions: spray gas (high purity nitrogen, 35 psi); collision gas (high purity helium); auxiliary gas (high purity nitrogen 12 L·min$^{-1}$); capillary temperature (350° C.); HV voltage (3500 V); scanning range (m/z 100-2200); stability of the compound (100%); collision energy (0.3-2 v); ESI ion source (positive and negative ion mode); flow rate (0.4 mL·min$^{-1}$); sample volume (10 µL). The final analysis was confirmed by UHPLC-QTOF-MS, the chromatograph was Agilent1290, the flow rate was 0.4 mL·min$^{-1}$, the sample volume was 2 µL, the shielding gas was $N_2$ (sprayer: 50 psi gas temperature: 350° C., gas flow rate: 11 L·min$^{-1}$), and the detector was a Q-TOF negative ion detector (scanning range: 100-1100; mass spectrometry resolution: m/z 400, scanning rate 1.5 Hz; error: 2 ppm). According to the above HPLC and LC-MS$^n$/UHPLC-QTOF-MS analysis, as shown in FIGS. 7, 8 and 9, it is shown that the liquid fermentation of the endophytic fungus strain of *Ophiopogon japonicus* can produce methylophiopogonanone B with a yield of 0.56 µg/g.

The preferred embodiment of the present disclosure has been described in detail above, but the present disclosure is not limited to the embodiment. Those skilled in the art can make various equivalent modifications or substitutions without violating the spirit of the present disclosure, and these equivalent modifications or substitutions shall fall into the scope defined by the claims of this application.

What is claimed is:

1. A method of using an endophytic fungus of *Ophiopogon japonicus* in preparation of methylophiopogonanone B, wherein the endophytic fungus of *Ophiopogon japonicus* has been deposited in the China General Microbiological Culture Collection Center on Jun. 16, 2023, with a category name of *Fusarium falciforme* OJ106, and a deposit number of CGMCC No. 40703, and wherein the endophytic fungus of *Ophiopogon japonicus* is adopted to prepare the methylophiopogonanone B by PDB liquid fermentation, which comprises:

(1) taking a certain number of hyphae with an inoculating needle from the endophytic fungus strain of *Ophiopogon japonicus* under aseptic conditions, inoculating the hyphae on a sterilized PDA plate, and cultivating the hyphae in a mould incubator at 26° C. until the hyphae cover surface of PDA culture medium; and (2) taking the PDA plate full of hyphae, preparing a fungus block with a puncher, placing the obtained fungus block in a PDB liquid culture medium for dark culture at 26° C., and extracting a hypha fermentation broth after the culture to obtain the methylophiopogonanone B.

2. The method according to claim 1, wherein a formula of the PDB liquid fermentation medium is: 200 g of potato, 20 g of glucose and 1000 mL of pure water.

3. The method according to claim 1, wherein a formula of the PDA culture medium is: 200 g of potato, 20 g of glucose, 15 g of agar and 1000 mL of pure water.

4. The method according to claim 1, wherein in the step (2), a process for extracting a hypha fermentation broth after the culture to obtain the methylophiopogonanone B comprises:

filtering the hypha fermentation broth under a reduced pressure to be divided into two fractions of hyphae and fermentation broth, drying and crushing the hyphae, ultrasonicating with methanol, and filtering under a reduced pressure to obtain a hypha filtrate; and extracting the fermentation broth with an equal amount of ethyl acetate, combining extracted ethyl acetate liquid with the hypha filtrate, carrying out vacuum concentration to obtain a fermentation extract, and obtaining the methylophiopogonanone B by redissolution with methanol.

\* \* \* \* \*